United States Patent [19]
Willinger

[11] Patent Number: 5,979,361
[45] Date of Patent: Nov. 9, 1999

[54] NON-SKID PET BOWL

[75] Inventor: Jonathan Willinger, Tenafly, N.J.

[73] Assignee: J.W. Pet Company, East Rutherford, N.J.

[21] Appl. No.: 08/977,096

[22] Filed: Nov. 24, 1997

Related U.S. Application Data

[60] Provisional application No. 60/035,703, Jan. 17, 1997.

[51] Int. Cl.⁶ .................................................. A01K 5/01
[52] U.S. Cl. ................................................................ 119/61
[58] Field of Search ...................... 119/51.5, 61; 174/37; 248/118.5

[56] References Cited

U.S. PATENT DOCUMENTS

| | | | |
|---|---|---|---|
| 3,776,193 | 12/1973 | Post, Sr. | 119/61 |
| 4,721,063 | 1/1988 | Atchley | 119/61 |
| 4,886,016 | 12/1989 | Atchley | 119/61 |
| 5,147,980 | 9/1992 | Ferguson, Jr. | 174/37 |
| 5,478,034 | 12/1995 | Cunningham et al. | 248/118.5 |
| 5,546,894 | 8/1996 | St-Pierre | 119/61 |
| 5,564,363 | 10/1996 | Soffici | 119/61 |
| 5,724,914 | 3/1998 | Nemeth | 119/61 |

*Primary Examiner*—Robert P. Swiatek
*Assistant Examiner*—Elizabeth Shaw
*Attorney, Agent, or Firm*—Helfgott & Karas, PC.

[57] ABSTRACT

A non-skid pet bowl including a bowl having an undersurface. A layer of thermoplastic elastomer is disposed over the undersurface of the bowl, which provides the bowl with a non-skid lower surface. The non-skid pet bowl may be formed by a molding process that includes molding the bowl from a first material. Further, molding the layer of thermoplastic elastomer over the undersurface of the bowl, which provides a stronger bond between the bowl and the layer of thermoplastic elastomer.

16 Claims, 2 Drawing Sheets

NON-SKID PET BOWL

This application claims the benefit of U.S. Provisional Application No. 60/035,703, filed Jan. 17, 1997.

BACKGROUND OF THE INVENTION

1. Field of the Invention

The invention relates generally to a water or food bowl or dish for household pets and in particular to an improved non-skid pet food or water bowl including a layer of non-skid material disposed over an undersurface.

2. Description of Prior Developments

One type of bowl commonly utilized for household pets is a molded plastic bowl. The advantages of the molded plastic bowl are quite obvious: a plastic bowl is inexpensive to manufacture; it can be molded in a variety of colors; it can be easily cleaned; and it can be dropped or otherwise misused without significant damage to its structure. For these cited reasons, plastic bowls have been preferred by the typical pet owner over bowls manufactured of non-plastic materials.

While certainly preferred, plastic bowls do have some disadvantages as compared to bowls manufactured of other materials such as metallic bowls. A significant disadvantage and one that is a function of the plastic material is that plastic bowls are generally much lighter in weight than the metallic bowls. The drawback of a light bowl is that it can be easily displaced or moved by a pet while the pet attempts to eat or drink making it difficult if not impossible for the pet to successfully nourish itself. Moreover the light weight of a plastic bowl make it quite easy for a household pet to topple or turnover the bowl resulting in an unwanted mess or hazardous condition.

In order to address the insufficiency in the weight of plastic bowls, various means have been employed to manufacture a heavier and more substantial bowl. One method employed has been to mold a plastic bowl with thicker and denser plastic walls; the benefit, of course, being that the added plastic results in a heavier bowl making it less susceptible to being displaced or moved by a pet during use. Another method employed, has been to mold a plastic bowl with an inner and outer wall so as to define a chamber between the walls. Within the chamber is provided some type of ballast material such as sand or cement making the bowl substantially heavier and thus difficult to displace during use. While these methods have been generally satisfactory, these bowls are generally more complicated to manufacture and/or may require more raw material and are consequently more costly to manufacture.

In lieu of weighting the bowls, some bowls have been fitted on their underside with a small resilient non-skid plastic or rubber piece or strip which is put in place after molding is completed in a secondary operation. The resilient strip which is in contact with the ground prevents the bowl from being easily slid by providing a friction force between the strip and the contact surface (ground). This technique, however, also adds significantly to the cost and is less than completely effective because only a small surface area of the bowl is equipped with the resilient material. Additionally as the resilient strips are generally only fitted onto the bowl, over time the resilient material will expand or deform to the point where it is no longer securely fixed to the bowl. Even where an adhesive has been used continued use will eventually result in the piece or strip separating altogether from the bowl.

SUMMARY OF THE INVENTION

The present invention has been developed to fulfill the needs noted above and therefore has as an object to produce a food or water bowl for household pets which may not be easily displaced or moved by the normal activity of the pet.

A still further object of the present invention is the provision of a pet bowl which is provided with an irremovable resilient member for preventing the displacement of the bowl and which will not deform over time.

These and other objects are met in accordance with the present invention which is directed to a non-skid pet bowl including a bowl having an undersurface. A layer of non-skid material is disposed over the undersurface of the bowl, which provides the bowl with a non-skid lower surface. The non-skid material is a thermoplastic elastomer material. Further, the non-skid material is patterned as a plurality of concentric circular rings, providing a suction effect between the bowl and the surface it is placed on.

According to the present invention, the non-skid pet bowl may be fabricated by the following method. Molding the bowl from a first material. Further, molding the layer of non-skid material over the undersurface of the bowl, which provides a stronger bond between the bowl and the non-skid surface.

BRIEF DESCRIPTION OF THE DRAWINGS

In the drawings.

In the various figures of the drawings, like reference characters designate like parts.

DETAILED DESCRIPTION OF THE PREFERRED EMBODIMENTS

The present invention will now be described in conjunction with the drawings beginning with FIG. 1, which depicts a pet bowl 10 constructed according to the present invention. As can be seen from FIG. 1, the pet bowl includes a bottom wall 12. Extending upward from the outer periphery of the bottom wall 12 is a side wall 14. The side wall 14 tapers upward into an opening forming a basic bowl structure. The bottom wall 12 and side wall 14 are preferably integrally formed as a one-piece structure from a plastic material such as Lexan, Acrylic, ABS or polypropylene.

Figure 1:
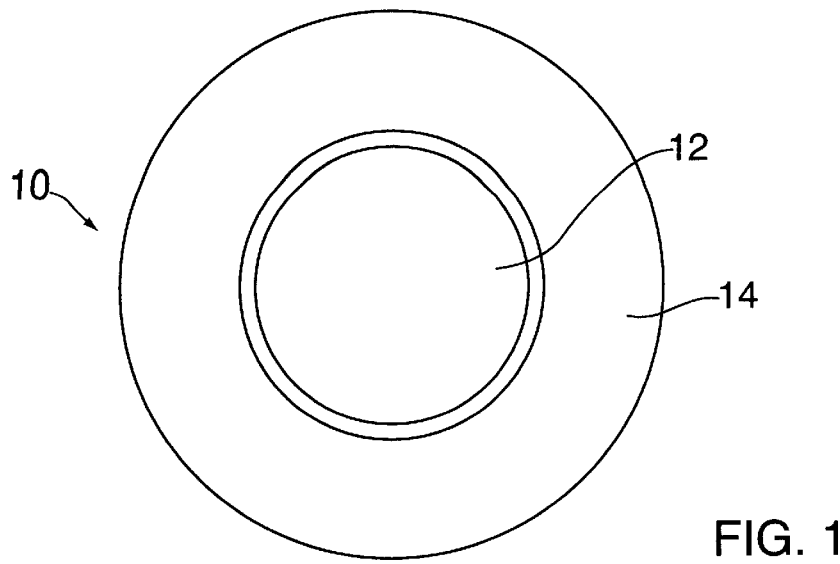
FIG. 1 is a top view of a pet bowl according to the present invention.
Figure 2:
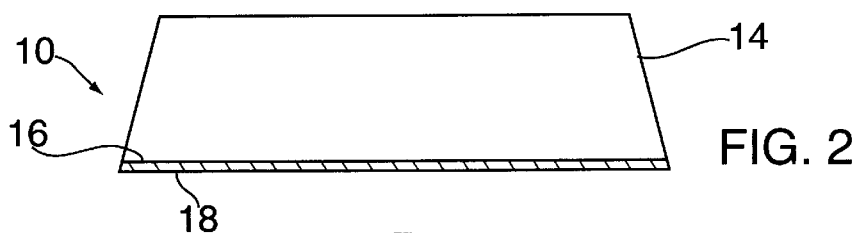
FIG. 2 is a side view of the pet bowl of FIG. 1.

Referring now to FIG. 2, there is shown a side view of the pet bowl 10 of FIG. 1. As can be seen from FIG. 2, the pet bowl 10 further includes a layer of non-skid material 18 disposed over the undersurface of the bowl 10. Having a layer of non-skid material 18 on the undersurface of the pet bowl is desirable in order to address the drawbacks of a utilizing a light weight plastic bowl for pets.

Light weight plastic bowls are easily displaced or moved by pets while attempting to eat or drink making it difficult if not impossible for the pet to successfully nourish itself. Moreover, the light weight of a plastic bowl makes it quite easy for a household pet to topple or turn over the bowl resulting in an unwanted mess or hazardous condition. However, the non-skid material 18 which contacts the ground prevents the bowl 10 from being easily slid by providing a greater frictional force between the bowl 10 and the ground.

An example of a suitable non-skid material 18 is a thermoplastic elastomer (TPE) material. It is also preferable that the layer of non-skid material 18 is integrally formed to the plastic bowl 10. This can be accomplished by fabricating the pet bowl 10 according to the present invention by utilizing a two material injection molding process, which will be described in detail later.

It should also be noted that although the non-skid material has been shown as a planar layer affixed substantially to the undersurface 16 of the bowl 10, the present invention also contemplates that the non-skid material is molded over the pet bowl in a wide array of patterns. For example, the non-skid material may be molded over the bowl so as to run midway up the side wall.

Figure 3:
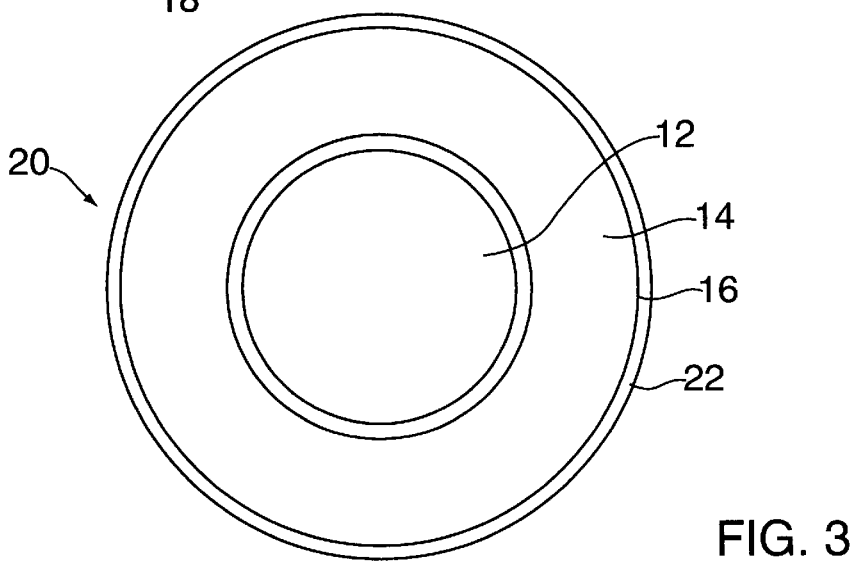
FIG. 3 is a top view of another embodiment of the pet bowl according to the present invention.
Figure 4:
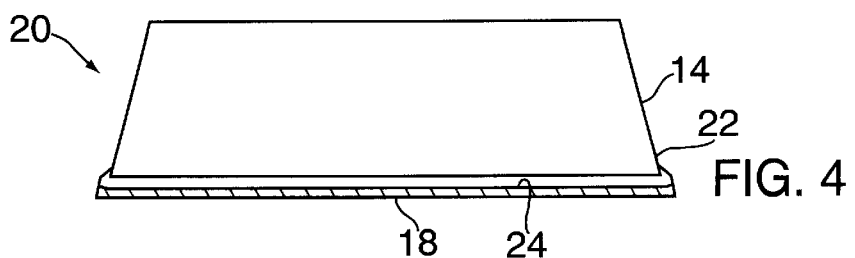
FIG. 4 is a side view of the pet bowl of FIG. 3.

Referring now to FIGS. 3 and 4, there is shown another embodiment of the pet bowl according to the present invention. This embodiment of the pet bowl 22 is the same as the embodiment previously described in regard to FIGS. 1–2, except that the bottom wall 12 now extends further downward and outward forming a base 22. The base 22 is desirable since it aids in stabilizing the bowl 20 by making it heavier and providing more surface area to contact the ground.

As can be seen from FIG. 4, the layer of non-skid material in this embodiment is disposed over the undersurface 24 of the base 22. Further, it is preferable that the base 22 is also integrally formed with the rest of the bowl 20.

Figure 5:
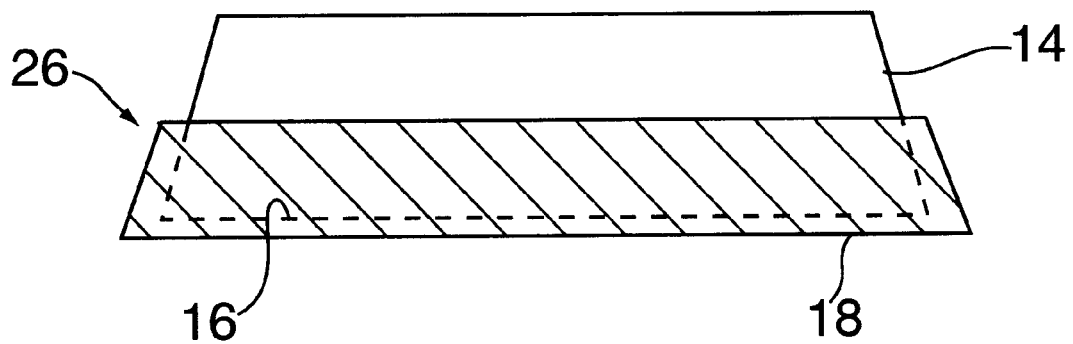
FIG. 5 is a side view of a still another embodiment of the pet bowl according to the present invention.

Referring now to FIG. 5, there is shown still another embodiment of the pet bowl according to the present invention. This embodiment of the pet bowl 26 is the same as the embodiment previously described in regard to FIGS. 1–2, except that the layer of non-skid material is disposed over the pet bowl 26 in a different pattern. In this embodiment 26, the layer of non-ski material 18 is disposed over the undersurface (shown in dotted line) 16 and also extends upward to run midway up the side wall 14.

Extending the non-skid material 18 to run midway up the side wall 14 is desirable since it provides a greater surface area to mold the non-skid material 18 over the bowl 26, thereby providing a greater bond between these two materials. This provides a more durable and longer lasting product.

Figure 6:
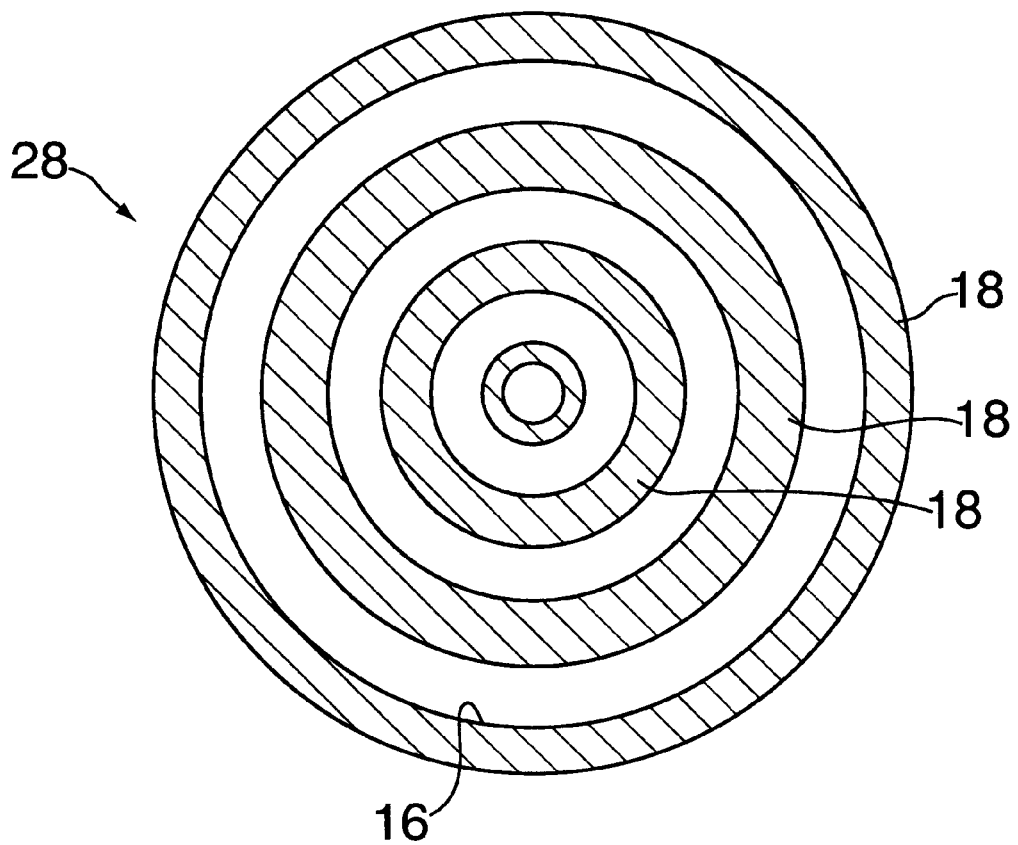
FIG. 6 is a bottom view of a still further embodiment of the pet bowl according to the present invention.

Referring now to FIG. 6, there is shown a bottom view of a still further embodiment of the pet bowl according to the present invention. This embodiment of the pet bowl 28 is the same as the embodiment previously described in regard to FIGS. 1–2, except that the layer of non-skid material is not disposed over the undersurface 16 of the pet bowl 28 in a continues pattern. In this embodiment 28, the layer of non-skid material 18 is patterned over the under surface 16 in a plurality of concentric circular rings.

The plurality of concentric circular rings 18 further addresses the drawback of utilizing a light weight plastic bowl for pets. In placing the pet bowl 28 on a flat surface, the air between the plurality of rings 18 will be displaced. Since the rings 18 protruding downward from the undersurface 16 contact the flat surface, a vacuum is formed in the area below the undersurface 16 between the rings 18.

The vacuum formed by the rings 18 as described above will provide a suction effect which will also prevent the bowl 28 from being skid or toppled over by a pet. Therefore, not only does the layer of non-skid material 18 in this embodiment 28 provide a non-skid effect, but it also provides a suction effect since the non-skid material is patterned as a plurality of concentric circular rings 18.

All four of the previously described embodiments of the pet bowl according to the present invention are preferably fabricated by a two material injection molding process. One example of such a process utilizes a two material injection molding machine along with either a rotating platen or rotating mold.

The rotating platen or rotating mold utilized in conjunction with the two material machine is utilized to secure the non-skid material to the undersurface of the plastic pet bowl. In particular, a relatively thin layer of a thermoplastic elastomer (TPE) would be over-molded onto the undersurface of a pre-molded plastic bowl.

The bowl is first molded out of a conventional plastic such as Lexan, Acrylic, ABS or polypropylene. The TPE base coating or layer is then molded over the existing dog bowl. Employing this method, the resulting bond between the TPE coating and existing bowl is significantly stronger than can be obtained by manual fitting or by the use of adhesives.

In practice, the two material injection molding machine is utilized to first mold a plastic bowl with a "first-shot" of plastic; a "second-shot" of TPE is then injected to form the base layer or coating of the bowl. The molding can be done utilizing either the rotating platen type mold or the rotating platen type machine. In this manner the mold or the machine would rotate substantially 180° degrees after the "first-shot" of material has been injected. Alternatively under this method the mold design could have a retracting core which would retract after the "first-shot" of plastic permitting the "second-shot" of material, preferably TPE, to be injected into the section of the mold forming the base.

Another example of a two material injection molding process utilizes two different injection machines, a robot type device, and an indexing table for over-molding a TPE strip or band over a molded plastic bowl according to the present invention. Using this technique, a first injection machine is used to mold the plastic pet bowl. After completion of the bowl injection cycle, a robot means transports the bowl from the first injection machine to a second injection molding machine. The robot places the now formed plastic bowl into a mold in the second molding machine which then molds the TPE bottom onto the bowl.

There has been disclosed heretofore the best embodiment of the invention presently contemplated. However, it is to be understood that various changes and modifications may be made thereto without departing from the spirit of the invention.

What is claimed is:

1. A non-skid pet bowl, comprising:
   an injection molded plastic bowl having an undersurface; and
   a layer of a non-skid material integrally injection molded over the undersurface of the bowl, thereby providing the bowl with an overmolded non-skid lower surface.

2. The pet bowl of claim 1, wherein the layer of non-skid material extends up a side wall of the bowl.

3. The pet bowl of claim 1, wherein the undersurface of the bowl extends downward and outward forming a base.

4. The pet bowl of claim 1, wherein the non-skid material is a thermoplastic elastomer material.

5. The pet bowl of claim 1, wherein the layer of non-skid material is patterned as a plurality of concentric circular rings.

6. A method of fabricating a non-skid pet bowl, comprising the steps of:
   injection molding a bowl having an undersurface formed of a first material; and
   injection molding a layer of a non-skid material over the undersurface of the bowl.

7. The method of claim 6, wherein the non-skid material is a thermoplastic elastomer material.

8. The method of claim 6, wherein the layer of non-skid material is patterned as a plurality of concentric circular rings.

9. The method of claim 6, wherein said first material is selected from the group consisting of Lexon, Acrylic, ABS and polypropylene material.

10. The method of claim 6, wherein after the first injection the first material is rotated 180 degrees.

11. The method of claim 6, wherein the first material is a plastic material.

12. The method of claim 6, wherein the two material injection molding process utilizes a rotating platen type mold.

13. The method of claim 6, wherein the two material injection molding process utilizes a rotating platen type injection machine.

14. The method of claim 6, wherein the injection molding process utilizes two separate injection machines.

15. The method of claim 6, wherein the bowl is molded to include a base.

16. A non-skid pet bowl, comprising:
- a bowl having an undersurface molded from a plastic material; and
- a layer of a thermoplastic elastomer injection molded on at least a portion of said undersurface of said bowl so as to form an overmolded non-skid lower surface portion on said bowl.

* * * * *